Figure 1:
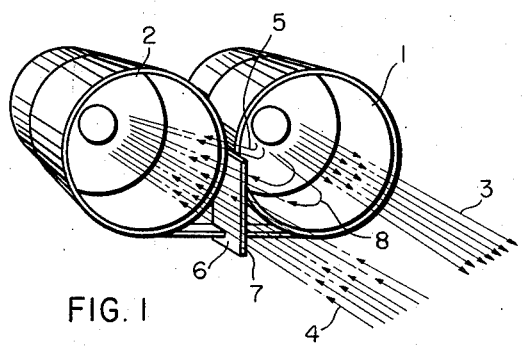

Sept. 23, 1952 W. F. MEEKER ET AL 2,611,445
ECHO RANGING SYSTEM
Filed Jan. 29, 1948

*INVENTORS*
WILLARD F. MEEKER
BY FRANK H. SLAYMAKER

Albert R. Hodges
ATTORNEY

Patented Sept. 23, 1952

2,611,445

UNITED STATES PATENT OFFICE 2,611,445

ECHO RANGING SYSTEM

Willard F. Meeker and Frank H. Slaymaker, Rochester, N. Y., assignors to Stromberg-Carlson Company, a corporation of New York Application January 29, 1948, Serial No. 5,038

10 Claims. (Cl. 181—0.5)

This invention relates to an improved echo ranging system, and more particularly to an arrangement for substantially eliminating spurious responses in such a system. Although not limited thereto, it is especially applicable to systems utilizing ultrasonic energy.

In an echo ranging system of the latter type, it is common practice to employ a transducer unit comprising a radiator, as for example a loud-speaker, and a receiver or microphone placed side by side. In operation, a pulse of ultrasonic energy or sound is emitted by the radiator and, if the sound strikes an object, a portion of it is echoed or reflected and picked up by the microphone. The length of time elapsing between emission and reception of the pulse is then a measure of the distance between the transducer unit and the object. The radiator and the microphone each has its response confined principally to a rather narrow beam so that when they are placed side by side and aligned with their axes of maximum response substantially parallel, the direction in which the object is located may be determined by moving the transducer unit until the maximum returning echo is received.

In echo ranging systems of the above-outlined conventional type in which the transducers are located side by side, a portion of the outgoing pulse of ultrasonic energy is diffracted at the edges of the radiator and the microphone, and thus is transmitted directly from the radiator to the microphone without being echoed or reflected from a distant object. The result of such diffraction is a spurious response which is indistinguishable from the response which would be obtained due to energy echoed or reflected from a small object very close to the transducer unit.

It is a principal object of the present invention, therefore, to provide an improved echo ranging system in which spurious responses are substantially eliminated.

It is a further object of the present invention substantially to eliminate spurious responses by providing a plurality of diffraction paths in an echo ranging system, the relative lengths of the paths being such that the energy diffracted through one of the paths is effectively canceled by energy diffracted through one or more of the remaining paths.

In accordance with the invention, there is provided, in an echo ranging system, a pair of transducers which are disposed in close proximity with their axes of maximum response substantially parallel. One of the transducers provides a beamed radiation adapted to be echoed or reflected by a distant object, and the second transducer is adapted to be energized by the reflected radiation. Means are provided for minimizing the effect upon the second transducer of energy transferred due to diffraction from the first transducer. These means comprise first and second diffraction paths between the transducers, the effective length of one of the paths exceeding the effective length of the other path by an odd number of half wavelengths of the radiation. For example, there may be provided a barrier disposed substantially perpendicularly to the plane including the axes of the transducers and extending across only a portion of the diffraction path between the transducers. The axial length of the barrier is such that the energy directly diffracted between the transducers is substantially canceled by the energy diffracted around the barrier. More specifically, the axial length of the barrier may be such that the diffraction path around the barrier is an odd number of half wavelengths of the beamed radiation longer than the direct diffraction path. The edge of the barrier remote from the transducers may be substantially parallel to the plane of the openings thereof, or it may be disposed at an appropriate angle with respect thereto.

Figure 2:
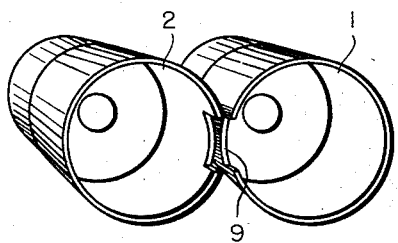
Figure 3:
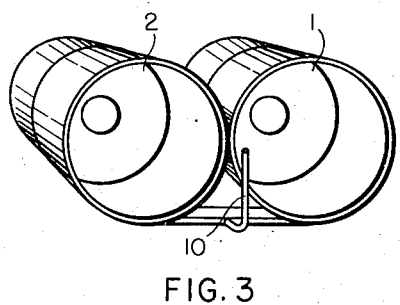

The invention will be better understood by reference to the following description taken in conjunction with the drawing, in which like components are designated by like reference numerals and in which:

Fig. 1 is a perspective view of that portion of an echo ranging system incorporating the improvements of the present invention; and Figs. 2 and 3 are respectively modified embodiments of the arrangement of Fig. 1.

Referring to Fig. 1 of the drawing, there is shown a pair of transducers 1 and 2, transducer 1 comprising a radiator or loud-speaker adapted to emit ultrasonic energy or sound which is diagrammatically represented by arrows 3. Transducer 2, which may for example comprise a microphone, is adapted to receive ultrasonic energy reflected from a distant object (not shown), the reflected energy being diagrammatically indicated by arrows 4. The transducers may correspond to those shown and claimed in Patent 2,541,944, issued February 13, 1951, to F. H. Slaymaker et al., and assigned to the same assignee as the present invention wherein the directions of maximum response are substantially parallel. A certain amount of the energy radiated by transducer 1 is diffracted directly to transducer 2, as indicated by arrows 5.

A barrier 6 of sheet-like material is disposed between transducers 1 and 2, and extends across only a portion of the diffraction path between the transducers. The axial length of barrier 6 is such that the diffraction path around the edge 7 of the barrier, indicated in Fig. 1 by arrows 8, is substantially one-half of the wavelength of radiated ultrasonic energy longer than the direct diffraction path represented by arrows 5. The extent of barrier 6 in the transverse direction preferably does not exceed the radius of transducers 1 and 2.

By virtue of the above-described relative arrangement and proportions of barrier 6, the ultrasonic energy following the direct diffraction path 5 from transducer 1 to transducer 2 will be substantially canceled by ultrasonic energy following the diffraction path 8 around the end of barrier 6, so that there will be no appreciable response from transducer 2 due to diffracted sound energy. The presence of barrier 6, however, has no appreciable effect upon the transfer of energy from transducer 1 to transducer 2 over the reflection paths 3 and 4.

Although the outer edge 7 of barrier 6 is shown substantially parallel to the planes of the openings of transducers 1 and 2, it will be understood that the angle of edge 7 may be adjusted to secure an even closer agreement between the magnitudes of directly diffracted ultrasonic energy and of the ultrasonic energy diffracted around barrier 6. These two magnitudes are preferably made closely equal by proper choice of the vertical dimension of barrier 6, a final exact balance then being secured by a slight adjustment of the position of barrier 6 with respect to transducers 1 and 2. Barrier 6 may be of any suitable material, as for example cardboard or metal.

Fig. 2 shows a modification of the present invention in which, instead of employing a separate barrier as shown in Fig. 1, a slot is provided between the transducers to secure first and second diffraction paths of different lengths. In the arrangement of this figure, transducers 1 and 2 are positioned closely adjacent each other with their axes of maximum response substantially parallel. A slot 9 is cut in the adjacent portions of the two transducers, the depth of this slot and its transverse length being such that the energy diffracted through the slot is of the proper phase and magnitude substantially to cancel the energy diffracted directly between the transducers.

Still another modification is shown in Fig. 3, in which transducers 1 and 2 are disposed as in Figs. 1 and 2. A rod-like obstacle 10 is provided, and it is disposed substantially perpendicularly to the plane including the axes of maximum response of the transducers. This obstacle serves to scatter a portion of the diffracted energy from one of the transducers, and thus modifies the effective length of one of the diffraction paths between the two transducers. The displacement of obstacle 10 with respect to transducers 1 and 2 is such that the energy thus diffracted and scattered may be made substantially equal in magnitude and of proper phase effectively to cancel the energy diffracted directly between the transducers.

In order to secure the maximum benefit from the arrangements in accordance with the present invention, it is necessary to minimize other forms of coupling between the transducers. Electromagnetic and electrostatic coupling may be satisfactorily minimized by the use of two-conductor shielded cables to the transducers, with the shield grounded to the covers and to the frame connecting the transducers. Mechanical transmission through the frame joining the transducers may be reduced to a satisfactory value by the use of resilient grommets to isolate each transducer from the connecting frame. Any direct transmission between transducers may be minimized by suitable acoustic treatment of the rear cover of each transducer, and by providing suitable acoustic seals for any small openings in the housings thereof.

In one particular embodiment of the present invention in accordance with Fig. 1, in which the radiated ultrasonic energy had a frequency of 65 kilocycles per second, a 10:1 reduction in the response due to diffracted energy was readily secured, using transducers having a radius of 1.0 inch and a barrier of cardboard having a thickness of 0.010 inch, a vertical dimension of approximately 0.75 inch, and extending a distance of approximately 0.25 inch from the plane of the openings of transducers 1 and 2.

Although an echo ranging system utilizing ultrasonic energy has been described in connection with examples of embodiments of the present invention, it will be understood that the principles thereof are equally applicable to a system employing electromagnetic energy. In a radar system, for example, pulses of ultrahigh-frequency energy are utilized. If separate transducers are used for transmission and reception, the arrangements of the present invention are suitable for substantially eliminating spurious responses due to diffraction at the adjacent edges of the transducers.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In an echo ranging system, in combination with a pair of directional transducers facing in the same direction and disposed in close proximity with their axes of maximum response substantially parallel, one of said transducers providing a beamed radiation adapted to be reflected by a distant object and the second transducer being adapted to be energized by said reflected radiation, the beamed radiation being subject to diffraction whereby a spurious response may be produced by said second transducer, and means for minimizing the effect upon said second transducer of energy transfer due to said diffraction from said first transducer comprising a barrier disposed between said transducers substantially perpendicularly to the plane including said axes and parallel to said axes and extending across only a portion of the diffraction path between said transducers, the axial length of said barrier being such that the energy directly diffracted between said transducers is substantially canceled by the energy diffracted around said barrier.

2. In an echo ranging system, in combination with a pair of directional transducers facing in the same direction and disposed in close proximity with their axes of maximum response substantially parallel, one of said transducers providing a beamed radiation of predetermined wavelength adapted to be reflected by a distant object and the second transducer being adapted to be energized by said reflected radiation, the beamed radiation being subject to diffraction whereby a spurious response may be produced by said second transducer, and means for minimizing the effect upon said second transducer of energy transfer due to said diffraction from said first transducer comprising a barrier disposed between said transducers substantially perpendicularly to the plane including said axes and parallel to said axes and extending across only a portion of the diffraction path between said transducer, the axial length of said barrier being such that the diffraction path around said barrier is an odd number of half wavelengths longer than the direct diffraction path, whereby the energy directly diffracted between said transducers is substantially canceled by the energy diffracted around said barrier.

3. In an echo ranging system, in combination with a pair of directional transducers facing in the same direction and disposed in close proximity with their axes of maximum response substantially parallel, one of said transducers providing a beamed radiation adapted to be reflected by a distant object and the second transducer being adapted to be energized by said reflected radiation, the beamed radiation being subject to diffraction whereby a spurious response may be produced by said second transducer, and means for minimizing the effect upon said second transducer of energy transfer due to said diffraction from said first transducer comprising a barrier disposed between said transducers substantially perpendicularly to the plane including said axes and parallel to said axes and extending across only a portion of the diffraction path between said transducers, the angle between the plane of the openings of said transducers and the edge of said barrier remote from said transducers being so chosen and the axial length of said barrier being such that the energy directly diffracted between said transducers is substantially canceled by the energy diffracted around said barrier.

4. In an echo ranging system, in combination with a pair of directional transducers facing in the same direction and disposed in close proximity with their axes of maximum response substantially parallel, one of said transducers providing a beamed radiation adapted to be reflected by a distant object and the second transducer being adapted to be energized by said reflected radiation, the beamed radiation being subject to diffraction whereby a spurious response may be produced by said second transducer and means for minimizing the effect upon said second transducer of energy transfer due to said diffraction from said first transducer comprising a barrier disposed between said transducers substantially perpendicularly to the plane including said axes and parallel to said axes and extending across only a portion of the diffraction path between said transducers, the edge of said barrier remote from said transducers being substantially parallel to the plane of the openings thereof and the axial length of said barrier being such that the energy directly diffracted between said transducers is substantially canceled by the energy diffracted around said barrier.

5. In an echo ranging system, in combination with a pair of directional transducers facing in the same direction and disposed in close proximity with their axes of maximum response substantially parallel, one of said transducers providing a beamed radiation of predetermined wavelength adapted to be reflected by a distant object and the second transducer being adapted to be energized by said reflected radiation, the beamed radiation being subject to diffraction whereby a spurious response may be produced by said second transducer, and means for minimizing the effect upon said second transducer of energy transfer due to said diffraction from said first transducer comprising a barrier disposed between said transducers substantially perpendicularly to the plane including said axes and parallel to said axes and extending across only a portion of the diffraction path between said transducers, the edge of said barrier remote from said transducers being substantially parallel to the plane thereof and the axial length of said barrier being such that the diffraction path around said barrier is an odd number of half wavelengths longer than the direct diffraction path, whereby the energy directly diffracted between said transducers is substantially canceled by the energy diffracted around said barrier.

6. In combination, a directional acoustical radiator and a directional microphone disposed in close proximity with their axes of maximum response substantially parallel and their openings faced in the same direction, said radiator and said microphone being of substantially equal radius, and a barrier of sheet-like material disposed between said radiator and said microphone substantially perpendicularly to the plane including said axes and parallel to said axes, said barrier extending in an axial direction beyond said radiator and said microphone openings a distance forming a substantial portion of a multiple of a quarter-wave length in the frequency of operation of said acoustic radiator, and extending in a transverse direction from said plane a distance substantially equal to said radius.

7. In an echo ranging system, in combination with a pair of transducers disposed in close proximity with their axes of maximum response substantially parallel, one of said transducers providing a beamed radiation adapted to be reflected by a distant object and the second transducer being adapted to be energized by said reflected radiation, means for minimizing the effect upon said second transducer of energy transfer due to diffraction from said first transducer comprising a slot in the adjacent portions of said transducers, the dimensions of said slot being such that the energy directly diffracted between said transducers is substantially canceled by the energy diffracted through said slot.

8. In an echo ranging system, in combination with a pair of transducers disposed in close proximity with their axes of maximum response substantially parallel, one of said transducers providing a beamed radiation adapted to be reflected by a distant object and the second transducer being adapted to be energized by said reflected radiation, means for minimizing the effect upon said second transducer of energy transfer due to diffraction from said first transducer comprising a rod-like obstacle disposed substantially perpendicularly to the plane including said axes, the displacement of said obstacle from said transducers being such that the energy directly diffracted between said transducers is substantially canceled by the energy diffracted to and scattered by said obstacle.

9. In combination, an acoustical radiator and a microphone disposed in close proximity with their axes of maximum response substantially parallel and their openings faced in the same direction, said radiator and said microphone being of substantially equal radius, and a slot in the adjacent portions of said radiator and said microphone, the dimensions of said slot being such that the energy directly diffracted between said radiator and said microphone is substantially canceled by the energy diffracted through said slot.

10. In combination, an acoustical radiator and a microphone disposed in close proximity with their axes of maximum response substantially parallel and their openings faced in the same direction, said radiator and said microphone being of substantially equal radius, and a rod-like obstacle disposed substantially perpendicularly to the plane including said axes, the displacement of said obstacle from said radiator and said microphone being such that the energy directly diffracted between said radiator and said microphone is substantially canceled by the energy diffracted to and scattered by said obstacle.

WILLARD F. MEEKER.
FRANK H. SLAYMAKER.

REFERENCES CITED

The following references are of record in the file of this patent:

UNITED STATES PATENTS

| Number | Name | Date |
|---|---|---|
| 2,103,357 | Gerhard | Dec. 28, 1937 |
| 2,177,769 | Erickson | Oct. 31, 1939 |
| 2,208,160 | McCreary | July 16, 1940 |
| 2,270,965 | Peterson | Jan. 27, 1942 |
| 2,287,533 | Peterson | June 23, 1942 |
| 2,455,888 | Brown | Dec. 7, 1948 |